United States Patent [19]

Putnam

[11] 4,091,403

[45] May 23, 1978

[54] DIAZO FILM ADVANCING MODULE

[75] Inventor: Dean H. Putnam, Toledo, Ohio

[73] Assignee: Magnagard Equipment Manufacturing Corporation, Toledo, Ohio

[21] Appl. No.: 617,595

[22] Filed: Sep. 29, 1975

[51] Int. Cl.[2] ........................ G03D 7/00; G03B 29/00

[52] U.S. Cl. ........................................ 354/300; 355/29

[58] Field of Search ............... 354/300, 297, 319, 320, 354/83, 90; 355/28, 29, 27, 100

[56] References Cited

U.S. PATENT DOCUMENTS

| | | | |
|---|---|---|---|
| 3,147,687 | 9/1964 | Halden | 354/299 |
| 3,229,608 | 1/1966 | Staub et al. | 354/300 X |
| 3,323,436 | 6/1967 | Hafer et al. | 354/300 |
| 3,325,911 | 6/1967 | Fleisher et al. | 354/300 X |
| 3,362,314 | 1/1968 | Wilde et al. | 354/300 |
| 3,532,047 | 10/1970 | Pensgen | 354/319 X |
| 3,547,020 | 12/1970 | Goldfarb | 354/90 |
| 3,684,373 | 8/1972 | Berge | 355/29 X |
| 3,718,395 | 2/1973 | Hollwedel | 355/27 |
| 3,720,150 | 3/1973 | Hurtig et al. | 354/300 |
| 3,836,252 | 9/1974 | Touchette et al. | 355/100 |
| 3,900,862 | 8/1975 | Bennett | 354/360 |

*Primary Examiner*—Donald A. Griffin

*Attorney, Agent, or Firm*—William J. Clemens

[57] ABSTRACT

A film advancing module which cooperates with a basic processing module to duplicate a master microfiche. The film advancing module includes a film drawing station for drawing a continuous strip of diazo microfilm from the basic processing module into the film advancing module, a film cutting station for separating an exposed film segment from the continuous strip of microfilm, a film developing station for drawing the film segment through ammonia vapor to develop it and a film receiving station for collecting the film segment. The supply of ammonia vapor to the film developing station is correlated with the advance of the film segment through the developing station so that essentially all of the ammonia vapor is utilized in the developing process. Any ammonia which might not be utilized is removed from the developing station and neutralized in a tank of citric acid. The developing station includes a plurality of rollers which define a serpentine path of travel for the film segment. The rollers are grouped in stacks with only the lower roller in each stack being driven and in turn driving the other rollers through "O" ring "tires" which may be offset from the "tires" of an adjacent stack to prevent streaking or tracking of the film segment.

13 Claims, 8 Drawing Figures

FIG. 1
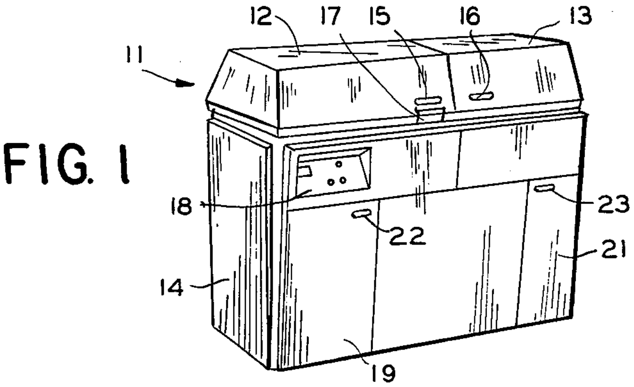
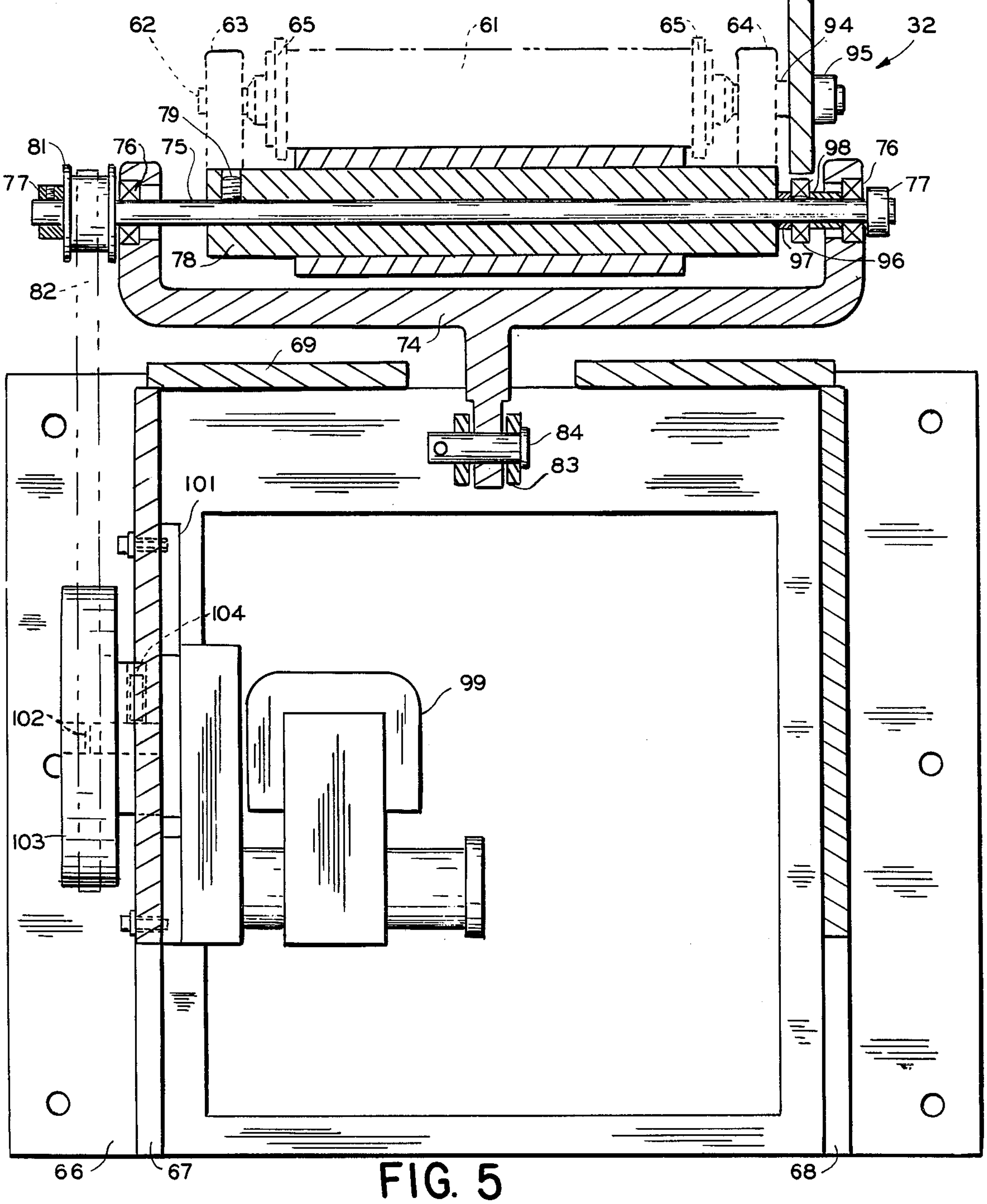
FIG. 5

DIAZO FILM ADVANCING MODULE

CROSS-REFERENCE TO RELATED APPLICATION

The diazo film advancing module of the present invention may be utilized with the basic processing module disclosed in co-pending patent application Ser. No. 587,082, filed June 16, 1975 in the name of Dean H. Putnam and entitled "Modular Microfiche Duplicator" which is assigned to the assignee of the present invention.

BACKGROUND OF THE INVENTION

1. Field of the Invention

This invention relates in general to a microfiche processing apparatus and in particular to a diazo film advancing module which cooperates with a basic processing module for processing diazo microfilm to make duplicates of master microfiche.

2. Description of the Prior Art

One form of microfilm is microfiche which is generally known as a group of related images arranged on a card-like transparent sheet of film. Typically, these sheets measure 105 mm by 148 mm and are unmounted. The wide-spread use of microfiche has lead to a demand for a means of duplicating the microfiche. However, the use of three major types of duplicating film, silver film, diazo film and vesicular film, requires the utilization of three different developing processes with their associated developing apparatus.

The diazo microfilm generally has a transparent polyester base coated with a diazonium salt. When the film is exposed to a light source through a master microfiche, the salt decomposes in those areas corresponding to the transparent areas of the master microfiche. The film is then passed through a heated ammonia vapor atmosphere wherein the ammonia couples with the diazonium salt to form an opaque image corresponding to the image of the master microfiche. Therefore, the diazo film duplicate is a positive of the master microfiche.

A major problem in the diazo film developing process is the escape of the ammonia vapor from the developing chamber. Generally, the ammonia vapor is supplied to the developing chamber under pressure so that there is a tendency for the vapor to leak past the seals at the entrance and exit of the chamber thereby causing an objectionable odor in the vicinity of the film processing machine. U.S. Pat. No. 3,653,242, issued Apr. 4, 1972 to N. P. Schleich and entitled "Apparatus For Treating A Continuous Body Under Pressure", discloses an apparatus for developing a continuous strip of diazo microfilm in a sealed chamber with the entrance and exist sealed by a pressure limiting capsule. Each capsule is comprised of two cellular pressure isolation zones, each zone formed of spaced thin flexible resilient diaphragms having a longitudinal slit centrally located. Any permeation of gas from the developing chamber into the first cellular zone is minimized by close contact between the film and a first diaphragm. As a result of the slow permeation, the partial pressure of ammonia gas is less in the first zone than in the developing chamber. A second diaphragm will minimize permeation from the first zone to the second zone which is defined by the second and a third diaphragm. The diaphragm slits may be shaped to accommodate thicker films to minimize binding. Therefore, this apparatus is limited in that the diaphragms must be changed when a different thickness of film is to be processed and the pressure limiting capsule seal is not effective where film segments are to be processed since the ammonia vapor is free to leak through the slits between the film segments.

U.S. Pat. No. 3,726,590, issued Apr. 10, 1973 to J. L. Kistner et al. and entitled "Fiche-To-Fiche Copier", discloses a fiche-to-fiche copier for developing diazo film microfiche. A movable platen is driven into sealed engagement with a fixed platen to define a developer chamber into which anhydrous ammonia gas is injected and then exhausted through a water trap. Although this apparatus eliminates the presence of ammonia vapor when the microfiche enters and exits the developer chamber, a small amount of vapor is retained and released when the chamber is opened and the mechanism for operating the movable platen is more complicated and costly than a fixed developing chamber.

SUMMARY OF THE INVENTION

The present invention relates to a compact diazo microfilm advancing module which cooperates with a basic processing module to make duplicates of master microfiche. A segment of a continuous strip of microfilm is exposed in superposition with the master microfiche in the basic processing module and is advanced into the film advancing module by a film drawing station. The film advancing module includes the film drawing station and a plurality of other film stations arranged in a compact relationship for performing selected operations on the film segment.

The exposed film segment is separated from the continuous strip of microfilm by a film cutting station and is drawn through a heated ammonia vapor atmosphere in a developing station to develop a positive of the master microfiche. Now the developed film segment is collected in a film receiving station.

In the present invention, the ammonia vapor is supplied from a reservoir as aqueous ammonia which is vaporized in a heater chamber before entering the film developing station. Aqueous ammonia has several advantages over anhydrous ammonia in that it is less expensive, it does not need to be under pressure and when it is vaporized it carries some water vapor which speeds up the chemical reaction in the developing process. The rate of generation of the ammonia vapor is correlated with the speed of the film segments as they are drawn through the film developing station in an attempt to maintain a stoichiometric balance where the volume of ammonia vapor which is introduced into the developing chamber is exactly the amount required to develop the microfilm. Since the amount of ammonia vapor required will be a function of the amount of unexposed diazonium salt on each film segment, the rate of metering of the amount of ammonia vapor will be an average rate. Therefore, a vapor trap at the entrance and exit and a liquid drain provide means to remove any excess ammonia from the developing chamber rather than allowing it to escape into the atmosphere. The excess ammonia is neutralized in a citric acid bath.

The developing station further includes a plurality of rollers mounted for rotation about a horizontal axis and positioned in vertical stacks to define a serpentine path of travel through the station. Only the lower roller in each stack is driven and it in turn drives the other rollers through "O" ring "tires". The "O" ring "tires" of adjacent stacks may be offset to prevent streaking or tracking on the surfaces of the film segment. The upper rollers in each stack are removable for easy access to jammed film segments.

It is an object of the present invention to provide a diazo film advancing module which can be utilized to separate, develop and collect a film segment exposed in a basic processing module.

It is another object of the present invention to provide a film advancing module having at least two film stations positioned to form a relatively compact path of travel for a film segment being developed.

It is a further object of the present invention to provide a modular microfiche duplicator for processing and developing types of microfilm at a minimum investment in duplicating equipment and with a reduction in the manual labor involved.

It is another object of the present invention to provide a diazo film advancing module in which virtually all the ammonia vapor is utilized in the developing process to eliminate the disagreeable odor associated with escaping ammonia vapor.

It is a further object of the present invention to provide a film advancing module in which the means for defining the path of travel through the developing station are removable for easy access to a jammed microfilm segment.

BRIEF DESCRIPTION OF THE DRAWINGS

FIG. 1 is a perspective view of a modular microfiche duplicator including a diazo film advancing module according to the present invention;

FIG. 5 is a cross-sectional view of the film drawing station of FIGS. 3 and 4 taken along the line 5—5 of FIG. 3 and enlarged;

DESCRIPTION OF THE PREFERRED EMBODIMENT

Figure 2:
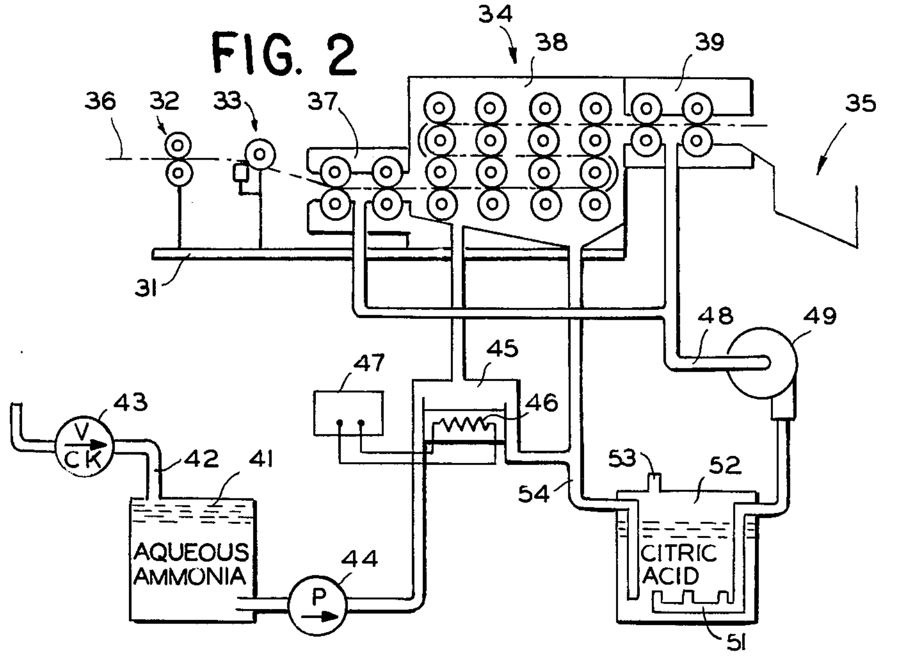
FIG. 2 is a schematic view of the diazo film advancing module of FIG. 1.

Referring to FIG. 1, there is shown in a perspective view a modular microfilm duplicator, including a diazo film advancing module according to the present invention, housed in a cabinet generally designated by a reference numeral 11. The cabinet 11 includes a basic processing module cover 12 and a film advancing module cover 13 mounted atop a base 14. Both of the covers 12 and 13 are hingedly attached to the base 14 along the rear edge thereof. Recessed handles 15 and 16 are formed on the front surfaces of the covers 12 and 13 respectively so that the covers may be raised to reveal the basic processing module and the film advancing module. An aperture 17 is formed in the front surface of the cover 12 for inserting and retreiving the master microfiche from the basic processing module.

The base 14 includes a base frame (not shown) covered by the external panels which cooperate with the covers 12 and 13 to shield the mechanisms of the duplicator from view and to provide a pleasing appearance. A recessed control panel 18, from which the functions of the duplicator can be controlled, is located in the front surface of the base 14 adjacent the cover 12. A pair of doors 19 and 21 are hingedly attached to the base 14, one at either end thereof, and can be opened by utilizing a pair of recessed handles 22 and 23, formed in the front surfaces of the doors 19 and 21 respectively, to reveal storage areas and elements of the duplicator mounted in the base 14.

The basic processing module located under the cover 12 may be the module disclosed in the co-pending U.S. Pat. application Ser. No. 587,082, filed June 16, 1975 in the name of D. H. Putnam and entitled "Modular Microfiche Duplicator" and assigned to the assignee of the present invention. The basic processing module exposes a continuous strip of microfilm in superposition with a master microfiche to a source of light to form a latent image of the master microfiche. The exposed film is then drawn into the film advancing module located under the cover 13. The film advancing module may be a silver film module which is disclosed in the application Ser. No. 587,082 which is incorporated by reference herein. The silver film module is utilized to collect the exposed strip of film for further processing outside the modular microfiche duplicator. A vesicular film advancing module may be utilized to develop and collect exposed vesicular film microfiche duplicates. The vesicular film advancing module may be the module disclosed in co-pending U.S. patent application Ser. No. 597,443, filed July 21, 1975 in the name of D. H. Putnam and entitled "Vesicular Film Advancing Module" and assigned to the assignee of the present invention. A diazo film advancing module, which is the subject of this application, may be utilized with the basic processing module to develop and collect exposed diazo film microfiche duplicates.

FIG. 2 is a schematic view of the diazo film advancing module according to the present invention. The diazo film module draws the exposed film in a continuous strip from the basic processing module of the modular microfilm duplicator, separates the film into segments each containing a duplicated master microfiche latent image, develops the segments as individual microfiche and collects the microfiche. The module includes a plurality of film stations for performing selected operations on the microfilm.

A module mounting bracket 31 may be attached to a frame (not shown) of the base 14 of FIG. 1 to support the developing apparatus. Mounted on the upper surface of the bracket 31 is a film drawing station 32, a film cutting station 33, a film developing station 34 and a film receiving station 35. A continuous strip of diazo film 36, shown in phantom, is exposed in the basic processing module to form latent images from the master microfiche and is pulled into the film advancing module by the film drawing station 32. The continuous strip of film is cut into segments of standard microfiche size, 105 mm by 148 mm, in the cutting station 33. These segments are duplicates of the master microfiche and are now ready for the developing process.

The separated microfilm segments enter the developing station 34 through a vapor trap 37 and are guided through a serpentine path by a plurality of vertical stacks of rollers as the segments are exposed to a heated vaporized ammonia atmosphere contained in a developing chamber 38. The microfilm segments exit the developing chamber 38 through another vapor trap 39 and are collected in the film receiving station 35.

The aqueous ammonia is stored in a reservoir 41 which is maintained at atmospheric pressure through a vent tube 42 which includes a one-way check valve 43 to prevent the escape of ammonia vapors. A metering pump 44 draws the liquid ammonia from the reservoir and supplies it to a vaporizing chamber of a heater 45. A resistance heating element 46 is connected to a source of electrical power 47 to produce joule effect heating in the vaporizing chamber. The vaporizing chamber of the heater 45 is connected to the developing chamber 38 to generate an ammonia vapor atmosphere in the developing chamber. The power supply can be controlled in response to the temperature in the developing chamber 38 to maintain the temperature in the range of 110° F to 140° F which is most favorable for developing the diazo microfilm. Aqueous ammonia is utilized rather than anhydrous ammonia since the liquid ammonia includes a small amount of moisture which is also vaporized and which enhances the chemical reaction in the developing chamber.

Since ammonia vapor has a rather unpleasant odor, the rate of generation of the ammonia vapor may be controlled so as to match the rate of use in the developing process to eliminate the excess ammonia vapor which might escape the diazo module. This may be accomplished by correlating the rate of flow of liquid ammonia through the pump 44 with the speed of the microfilm segment through the developing chamber. If, for example, the pump speed is set by the speed of rotation of the stacked rollers and is turned on and off by the operation of the film cutting station 33, the correct amount of liquid ammonia may be introduced into the heater 45 when the microfilm segment is separated from the continuous strip of film 36. The liquid ammonia will be vaporized and introduced into the developing chamber 38 as the microfilm segment is passed through to be developed thereby utilizing virtually all the ammonia vapor.

However, since the amount of unexposed diazonium salt varies between film segments, the pump 44 must be set for an average rate of flow which will assure that film segments with relatively large amounts of unexposed diazonium salt will be fully developed. The vapor traps 37 and 39 are provided to remove any excess ammonia vapor from the developing chamber to prevent its escape to the surrounding atmosphere.

Each of the vapor traps 37 and 39 include two pairs of cooperating rollers which seal the inlet and outlet of the developing chamber against the leakage of ammonia vapor. A slight negative pressure is drawn on the cavity formed between the pairs of rollers in each vapor trap to remove any ammonia which might leak past the inner pair of rollers. The cavities are connected to the branches of an exhaust tube 48 which in turn is connected to the inlet of a blower motor 49. The blower motor 49 exhausts through a bubbler 51 located in the bottom of a tank 52 containing citric acid. The citric acid neutralizes the ammonia allowing the ammonia free air to bubble to the top of the tank 52 and escape through a vent 53 to the atmosphere. The developing chamber 38 and the heater 45 also are connected to the branches of a drain tube 54 which in turn opens into the bottom of the tank 52 to remove any liquid ammonia which may accumulate in the developing chamber or the heater. However, since the vaporization of ammonia for the developing process is correlated with the amount of microfilm which passes through the developing chamber, there will be little vapor or liquid to introduce into the citric acid tank.

The liquid ammonia reservoir 41, the metering pump 44, the heater 45, the power supply 47, the blower 49 and the citric acid tank 52 may be included in the diazo advancing module or they may be housed in the main frame of the cabinet 11 of FIG. 1 and coupled to the diazo film advancing module with quick disconnect hose couplings.

Figure 3:
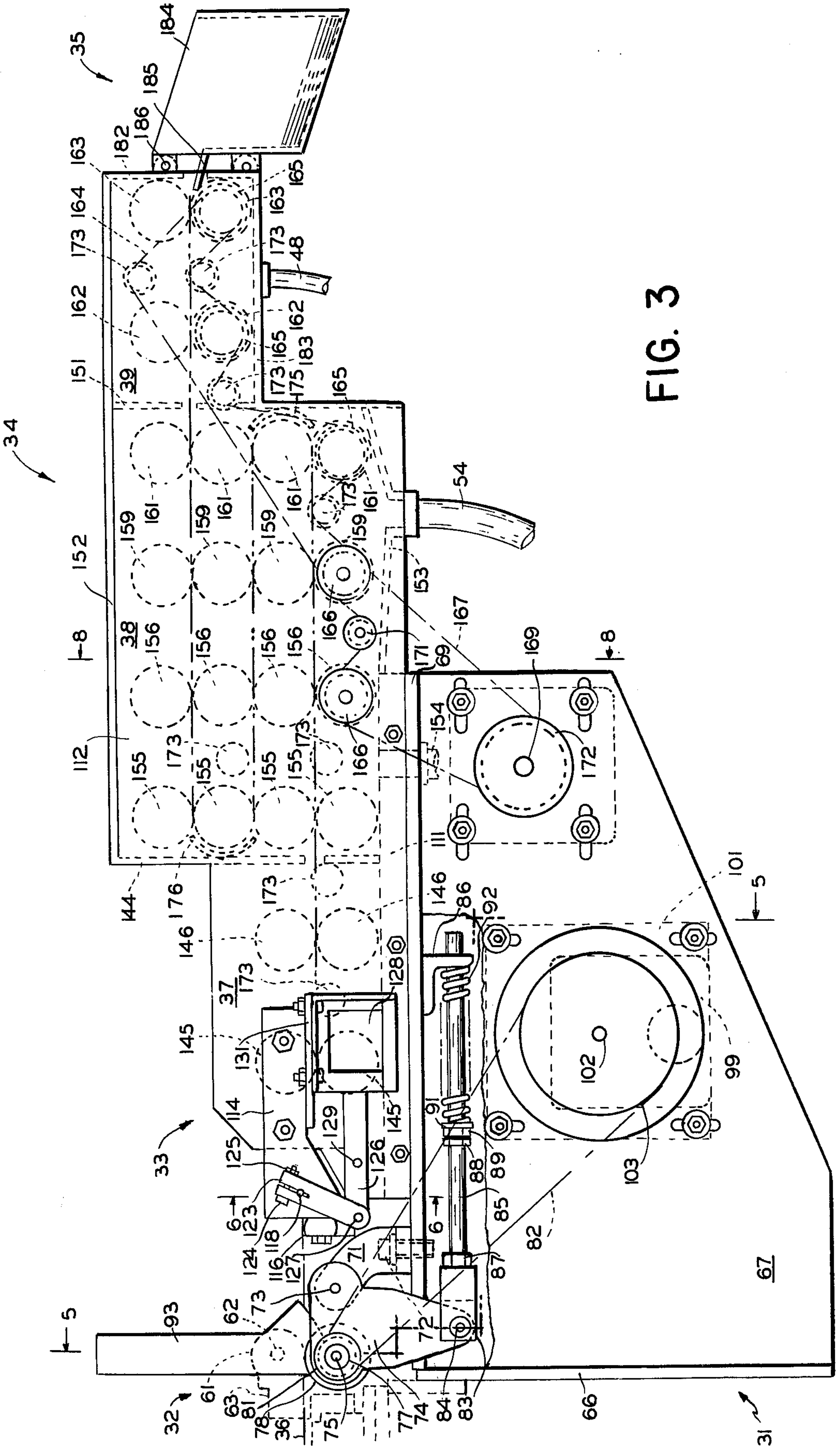
FIG. 3 is a fragmentary front elevational view of the diazo film advancing module of FIG. 1.
Figure 4:
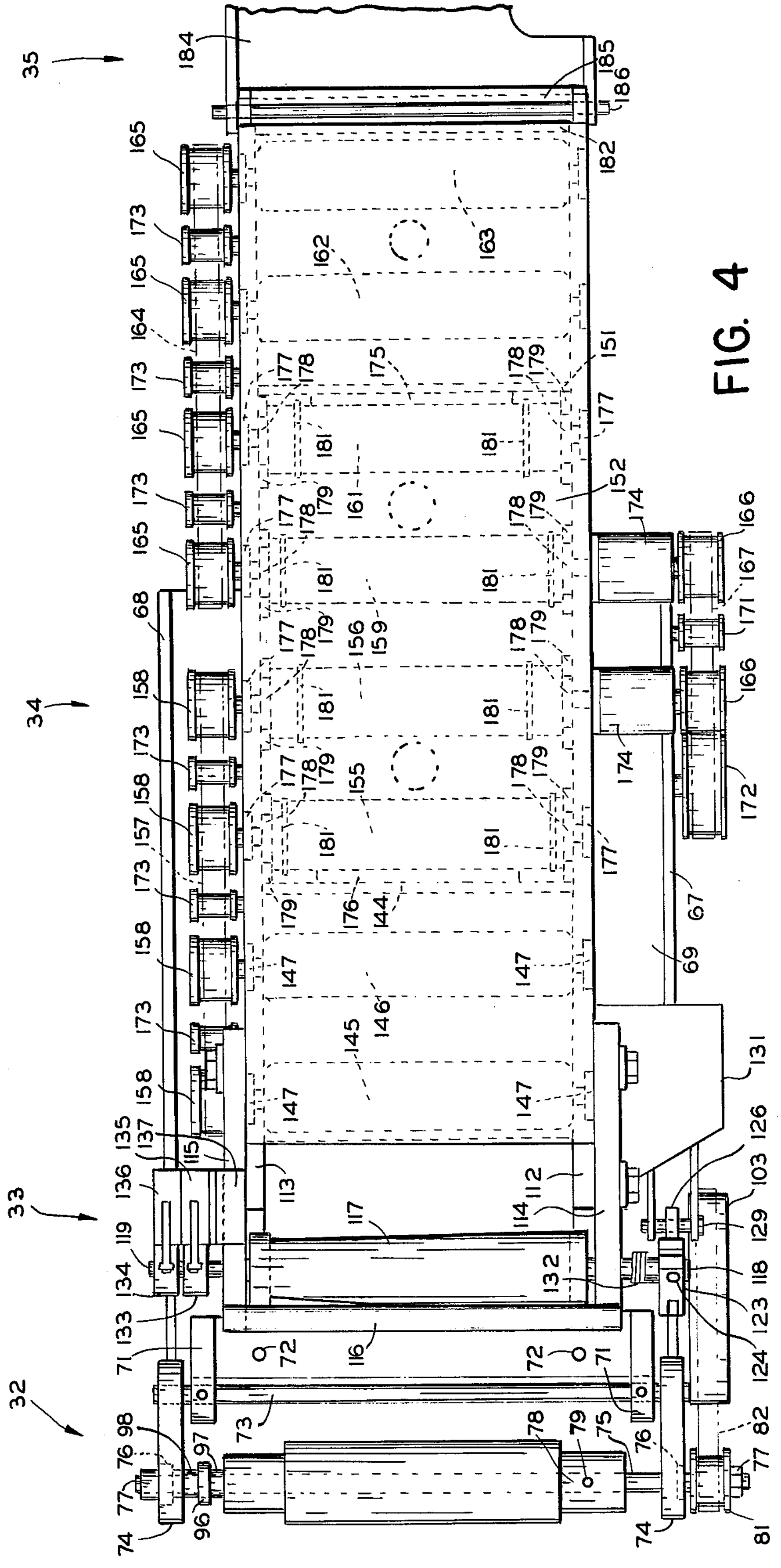
FIG. 4 is a plan view of the diazo film advancing module of FIG. 1.

FIG. 3 is a front elevational view and FIG. 4 is a plan view of the diazo film advancing module according to the present invention. The diazo film module draws the exposed film in a continuous strip from the basic processing module of a modular microfilm duplicator, separates the film into segments each containing a duplicated mater microfiche latent image, develops the segments as individual microfiche and collects the microfiche. FIG. 5 is a cross-sectional view of the film drawing station 32 of the diazo film advancing module taken along line 5—5 of FIG. 3. Referring to FIGS. 3, 4 and 5, there is shown the vesicular film advancing module attached to the right side of the frame of the basic processing module. A portion of the frame and a guide roller 61 of the basic processing module are shown in phantom. The guide roller 61 is rotatably mounted on a shaft 62 which is attached to a pair of mounting brackets 63 and 64. The guide roller 61 has formed at either end thereof a guide 65 for defining the edges of a path of travel for the continuous strip of film 36 as its exits the basic processing module and enters the film drawing station 32.

The module mounting bracket 31 is formed with a vertically positioned end plate 66 which is fastened to the right side of the basic processing module frame by any suitable means such as cap screws, lockwashers and nuts such that the diazo film advancing module can easily be replaced by a module for advancing a different type of film. A pair of support plates, front support plate 67 and rear support plate 68, extend perpendicularly from the outwardly facing planar surface of the end plate 66. A mounting plate 69 rests on the top edges of the support plates and end plate 66, the support plates 67 and 68 and the mounting plate 69 are attached together as by welding to form the module mounting bracket 31.

The film drawing station 32 includes a pivot bracket 71 mounted on the upper surface of the mounting plate 69 with cap screws 72. The pivot bracket 71 is formed with a pair of upstanding bosses which extend toward the guide roller 61. A pivot shaft 73 extends through an aperture formed in each of the bosses and is secured against rotation by a pair of set screws which are axially threaded into the bosses for frictional engagement with the pivot shaft 73. The ends of the pivot shaft 73 extend beyond the outwardly facing surfaces of the pivot bracket bosses and are inserted into apertures in a pair of upper legs of a "Y" shaped yoke 74. The yoke 74 is free to rotate about the axis of the pivot shaft 73 yet is prevented from movement along that axis by the bosses.

Also formed in the upper legs of the yoke 74 are a pair of apertures for receiving the ends of the roller shaft 75. The shaft 75 is free to rotate in a pair of ball bearings 76 press fitted into the legs of the yoke. A pair of set collars 77, one attached at either end of the shaft 75, militate against axial movement of the shaft in the bearings. The shaft extends through an axial aperture in a drawing roller 78 which is attached to the shaft with a radially threaded set screw 79 which frictionally engages the shaft. The roller 78 has a neoprene driving surface formed thereon. If the yoke 74 is rotated in a clockwise direction, as viewed in FIG. 3, about the pivot shaft 73, the neoprene driving surface of the roller 78 will trap the strip of film 36 against the guide roller 61. A pulley 81 is attached to the forwardly facing end of the shaft 75 between the bearing 76 and the set collar 77. If the pulley is rotated in a clockwise direction by a motor driven belt 82, shown in phantom, the neoprene driving surface of the roller 78 will frictionally engage the lower surface of the film strip 36 to draw it through the basic processing module and into the diazo film advancing module.

The drawing roller 78 is maintained in engagement with the film strip through a force applied to the lower leg of the "Y" shaped yoke 74. This lower leg extends through an aperture in the mounting plate 69 and is connected to one end of a clevis coupling 83 by a clevis pin 84. The other end of the clevis coupling threadably engages one end of a spring pin 85. The other end of the spring pin is inserted through an aperture in a spring pin guide 86 which is attached to the lower surface of the mounting plate 69. A stop nut 87 is threaded onto the spring pin 85 and against the clevis coupling 83 to prevent the spring pin from disengaging from the coupling. A pair of stop nuts 88 and 89 are threaded onto the spring pin 85 at a point approximately midway between the coupling 83 and the spring pin guide 66. A flat washer 91 is positioned on the spring pin adjacent the stop nut 89 and a helical spring 92 is compressed between the flat washer and the guide. Since the spring pin 85 is free to move in the aperture of the guide 86, the clevis coupling will be forced in a direction away from the guide to apply a force to the yoke 74 which creates a clockwise movement about the pivot shaft 73. Thus, the neoprene driving surface of the drawing roller 78 is maintained in contact with the lower surface of the strip of film 36.

When it is desired to remove the strip of film from the film drawing station, the drawing roller 78 may be rotated in a counterclockwise direction utilizing a lever arm 93. The rearwardly facing end of the shaft 62 is inserted through an aperture in a spacer 94 and an aperture in the lever arm 93. The lever arm 93 and the spacer 94 are trapped between the rearwardly facing surface of the mounting bracket 64 and a set collar 95. However, the lever arm is free to rotate about the shaft 62. The lower end of the lever arm 93 has formed thereon a camming surface including a first depression shown in FIGS. 3 and 5 as engaging the edge surface of a ball bearing 96. The rearwardly facing end of the roller shaft 75 is inserted through an aperture in a first spacer 97, an aperture in the ball bearing 96 and an aperture in a second spacer 98 respectively. The two spacers and the ball bearing are trapped between a rearwardly facing end surface of the drawing roller 78 and a forwardly facing surface of the ball bearing 76. The shortest dimension between the pivot point of the lever arm 93 and the edge of the first depression of the cam surface is such as to allow the neoprene surface of the drawing roller 78 to come into contact with the lower surface of the film strip 36 and be slightly compressed. The lever arm 93 may be rotated in a clockwise direction about the shaft 42 to bring a second depression on the camming surface into contact with the ball bearing 96. The shortest dimension between the pivot point of the lever arm and the edge of the second depression is such that the neoprene surface of the drawing roller is forced out of contact with the lower surface of the strip of film and the film is released from the drawing station so that it may be removed from the diazo film advancing module.

A magnetic brake gear motor 99 is attached to the rearwardly facing surface of a motor mounting plate 101. The motor mounting plate 101 is attached to the rearwardly facing surface of the front support plate 67 by any suitable means such as cap screws and lockwashers. The cap screws are inserted into vertically elongated apertures formed in the support plate 67 and threadably engage the mounting plate 101. An output shaft 102 of the gear motor 99 extends through apertures in the mounting plate 101 and the support plate 67. A pulley 103 is attached to the end of the output shaft by a set screw 104. The cap screws may be loosened to allow vertical movement of the mounting plate 101 to adjust the tension on the belt 82 which engages the pulley 103. When the gear motor 99 is energized from a power source (not shown) the drawing roller 78 will be rotated to draw the strip of film into the developing module. The magnetic brake may be actuated to stop the gear motor and hold it and the drawing roller 78 against rotation as the strip of film is being cut.

Figure 6:
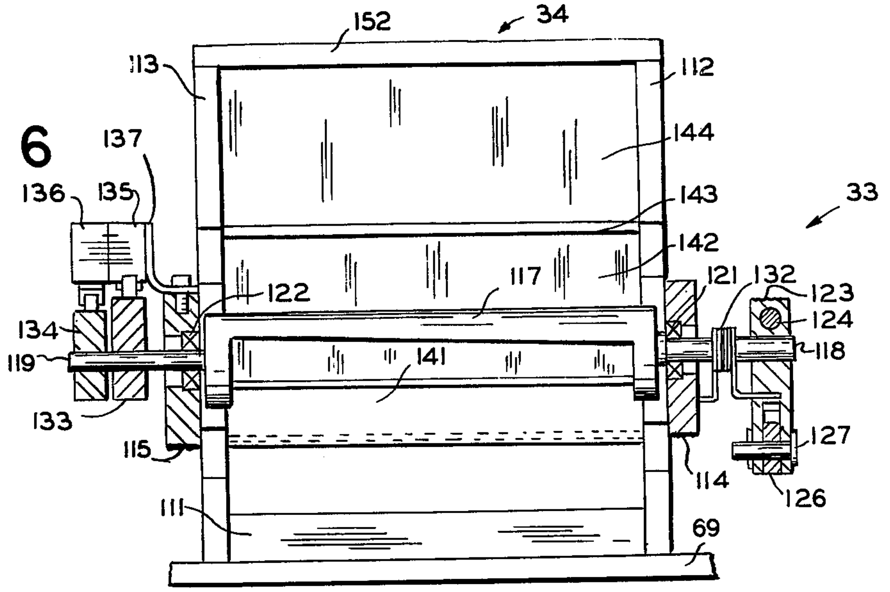
FIG. 6 is a cross-sectional view of the film cutting station of FIGS. 3 and 4 taken along the line 6—6 of FIG. 3 and enlarged.
Figure 7:
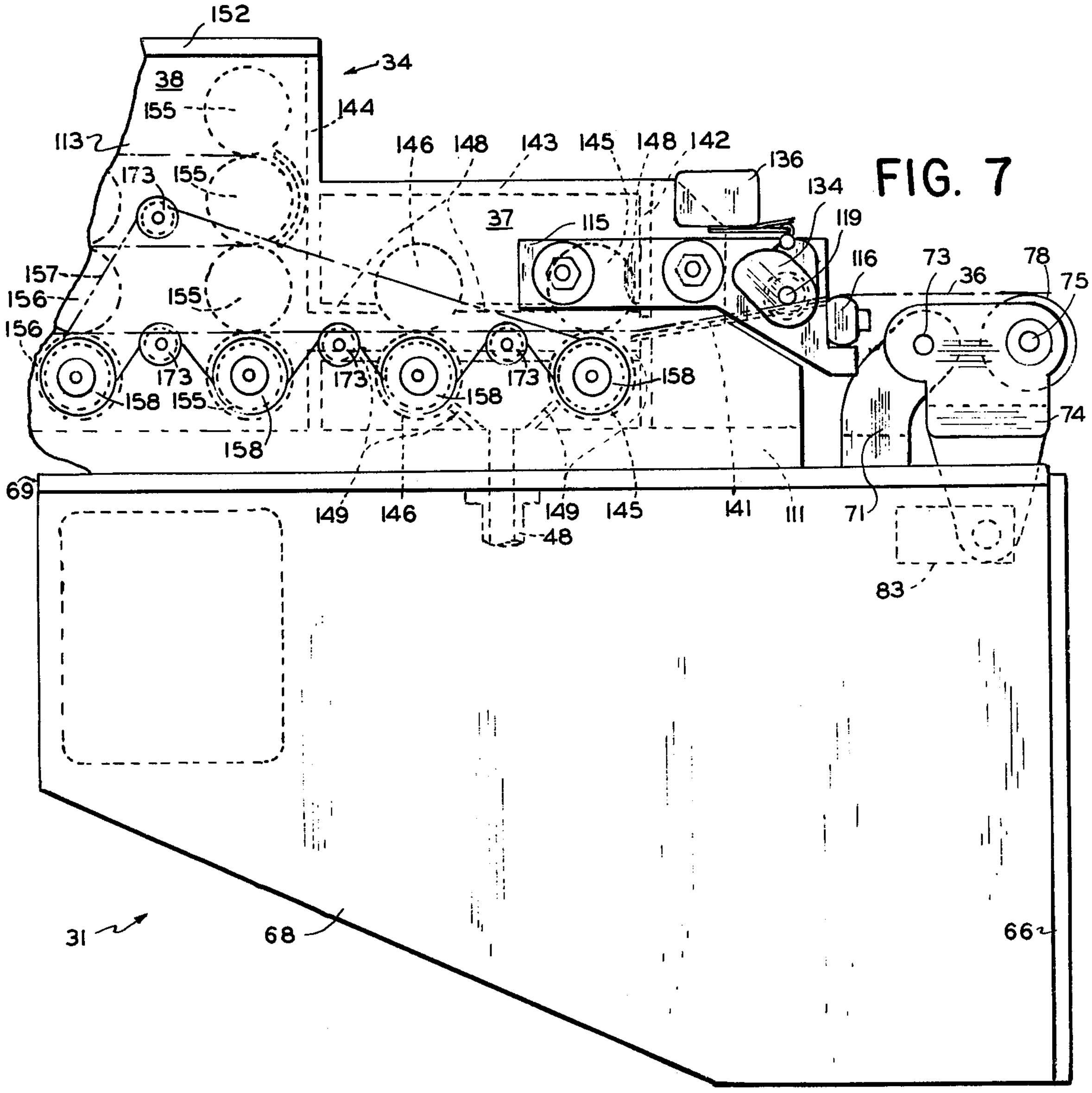
FIG. 7 is an enlarged fragmentary rear elevational view of the film cutting station and the film developing station of FIGS. 3 and 4.

The strip of film 36 passes through the film drawing station 32 and enters the film cutting station 33 where it is cut into segments equal in length to a standard microfiche, each segment containing the latent image of a master microfiche. FIG. 6 is a cross-sectional view of the film cutting station 33. FIG. 7 is a fragmentary rear elevational view of the cutting station. Referring to FIGS. 3, 4, 6 and 7, there is shown a spacer plate 111 attached to the upper surface of the mounting plate 69 by any suitable means such as cap screws. Attached to the front and rear edge surfaces of the spacer plate 111 are a front mounting plate 112 and a rear mounting plate 113 respectively on which the film cutting station 33, the film developing station 34 and the film receiving station 35 are mounted.

The film cutting station 33 includes a front knife mounting knife bracket 114 which is attached to the forwardly facing surface of the front mounting plate 112 and a rear knife mounting bracket 115 which is attached to the rearwardly facing surface of the rear mounting plate 113. A knife bar 116 is attached to the ends of the mounting brackets 114 and 115 adjacent the film drawing station 32. The upper edge of the knife bar 116 which faces the mounting brackets is a knife edge which cooperates with a rotating knife roller to cut the continuous strip of microfilm across its width. The opposite upper edge of the knife bar may also be a knife edge so that the bar can be reversed to double its cutting life. The upper surface of the knife bar may be coated with TEFLON to prevent scratching the lower surface of the film.

A knife roller 117 has formed at either end thereof a shaft extension, front shaft 118 and rear shaft 119, which extend through apertures in the mounting brackets 114 and 115 respectively. The front shaft 118 rotates in a ball bearing 121 press fitted into the mounting bracket 114 and the rear shaft 119 rotates in a ball bearing 122 press fitted into the mounting bracket 115. A knife edge is formed at the intersection of a planar surface with the exterior cylindrical surface of the roller 117. As shown in FIG. 6, more than one half of the roller is cut away to define the planar surface which has a chordal edge adjacent the front shaft extension 118 and extends away from the axis of the roller at approximately 1° 30′ to an opposite chordal edge adjacent the rear shaft extension 119. Thus, as the roller 117 is rotated in a counterclockwise direction, as viewed in FIG. 3, the strip of film will be caught between the knife edge of the roller 117 and the knife edge of the bar 116. Since the knife edge of the roller is tapered with respect to the axis of the roller, only a point contact will be made with the film so that the point contact travels from the front end to the rear end of the roller as it rotates to cut across the width of the strip of film.

The front shaft extension 118 is inserted through an aperture in a knife actuator arm 123. A slot extends from the upper end of the arm to the aperture to form a pair of legs. A cap screw 124 extends through an aperture in each of the legs and threadably receives a nut 125 which may be tightened to force the legs toward one another thereby clamping the arm 123 in a selected position on the shaft 118. The lower end of the arm has a clevis formed thereon which is connected to one end of a link 126 by a clevis pin 127. The other end of the link 126 is connected to an actuating rod of a solenoid 128 by a clevis pin 129.

The solenoid 128 is attached to a solenoid mounting plate 131 which in turn is attached to the lower edge surface of the front knife mounting bracket 114. The solenoid may be actuated to retract its actuating rod which forces the arm 123 and the knife roller 117 to rotate in a counterclockwise direction about the axis of the knife roller thereby cutting across the width of the continuous strip of film. When the actuating arm is fully retracted, the solenoid coil may be turned off and a torsion spring 132 will rotate the arm 123 back to its original position to move the knife edge of the roller 117 away from the knife edge of the bar 116. The spring 132 has one end inserted in an aperture formed in the front knife bracket and the other end inserted in the arm 123. The spring is helically wound in a direction to tend to force the arm 123 to rotate in a clockwise direction limited by the free travel of the actuating rod of the solenoid 128.

The rear shaft extension 119 extends through an aperture in a pair of cams 133 and 134. Each cam is attached to the shaft extension 119 by a set screw. The cams 133 and 134 rotate with the shaft to actuate a pair of microswitches 135 and 136 respectively. The microswitches 135 and 136 are attached to a switch mounting bracket 137 which in turn is attached to the rear knife mounting bracket 115. The cams 133 and 134 are angularly displaced from one another such that the cam 133 actuates the microswitch 135 when the knife roller is at rest and the cam 134 actuates the microswitch 136 when the knife roller is rotated to the position defined by the end of travel of the actuating rod of the solenoid 128. If the solenoid is energized from a power source (not shown) to rotate the knife roller, the cam 133 may be positioned to actuate the microswitch 135 when the strip of microfilm has been completely cut. The actuation of the microswitch 135 will disconnect the solenoid from the power source and the tension spring will return the solenoid and the knife roller to the rest position. At this point the cam 134 actuates the microswitch 136 which actuates the film drawing station 32 to advance the strip of film. If the film is measured in the basic processing module to determine when an amount equal in length to a standard microfiche has been drawn in, this determination can be utilized to turn off the drawing station and to energize the solenoid.

Figure 8:
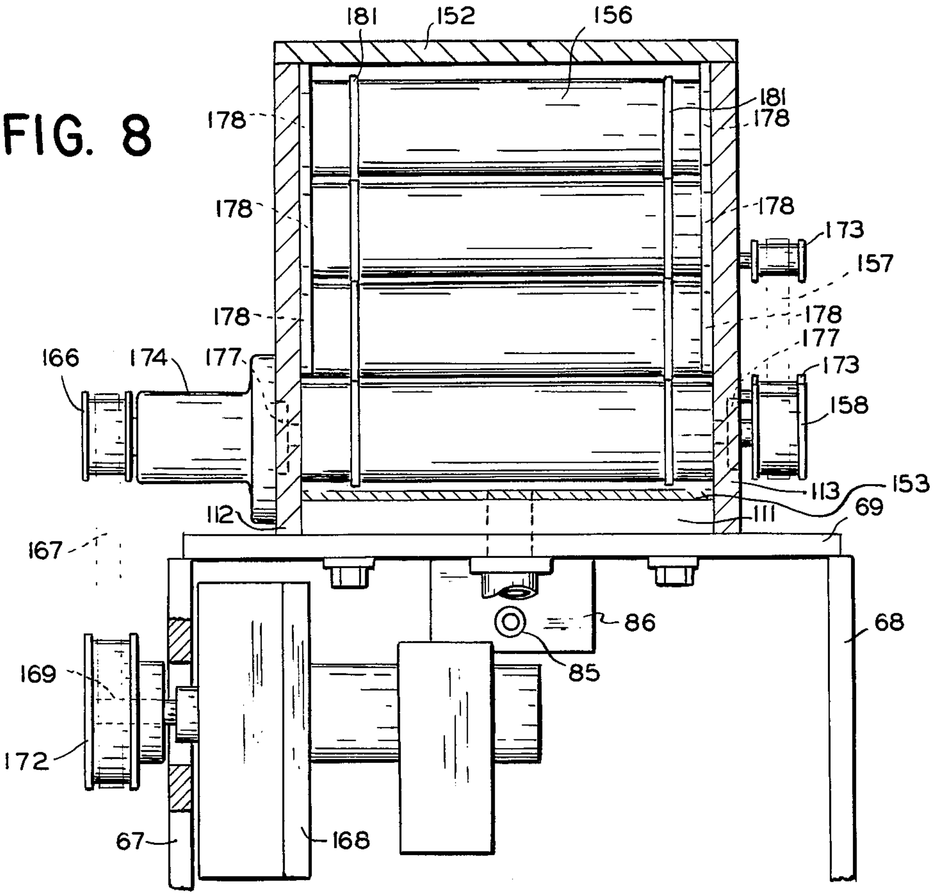
FIG. 8 is a cross-sectional view of the film developing station of FIGS. 3 and 4 taken along the line 8—8 of FIG. 3 and enlarged.

The microfilm segments from the film cutting station 33 now pass through the film developing station 34 where they are exposed to an ammonia vapor to develop a positive of the master microfiche. FIG. 8 is a cross-sectional view of the film developing station 34. Referring to FIGS. 3, 4, 6, 7 and 8, there is shown the entrance vapor trap 37, the developing chamber 38 and the exit vapor trap 39 which include a plurality of rollers for defining the path of travel of the microfilm segments from the film cutting station 33 to the film receiving station 35.

Since the entrance vapor trap 37 and the exit vapor trap 39 are similar in construction and operation, only the entrance vapor trap will be discussed in detail. When a microfilm segment is separated in the film cutting station 33, it falls onto a slide member 141 which is attached to the front mounting plate 112 and the rear mounting plate 113 and extends through an aperture in a front wall 142 of the entrance vapor trap 37. Under the influence of gravity, the microfilm segment will slide down the slide member 141 and through the aperture in the front wall 142 into the vapor trap 37 which is defined by the spacer plate 111, the front and rear mounting plates 112 and 113, the front wall 141, a cover plate 143 and a front developing chamber wall 144.

The vapor trap 37 includes two pairs of rollers, a front pair 145 and a rear pair 146, which are rotatably mounted in a plurality of bearings 147 retained in the front and rear mounting plates 112 and 113. The pairs of rollers are spaced apart less than the length of a microfilm segment. One roller in each pair is positioned above the other to place the surfaces of the rollers in contact. The rollers each may have a neoprene driving surface formed thereon to frictionally engage the upper and lower surfaces of the microfilm segments thereby sealing against the escape of ammonia vapor. The lower rollers 145 and 146 are driven, as will be discussed, to draw the microfilm segments from the slide member 141 through an aperture in the front wall 144 and into the developing chamber 38. The rollers in the vapor trap 37 and 39 and the developing chamber 38 may be driven at a faster speed than the drawing roller 78 to obtain greater separation between the film segments.

Any ammonia vapor which is not utilized in the developing process may leak out the aperture in the front wall 144. This vapor is prevented from escaping to the surrounding atmosphere by a pair of seals and the blower motor 49 of FIG. 2. An upper seal 148 encloses the upper portion of the vapor trap 37 and a lower seal 149 encloses the lower portion of the vapor trap 37 to form a cavity between the seals through which the microfilm segments are drawn. The seals can be formed from a flexible material, such as a rubber impregnated fabric, and positioned so that a portion of each of the rollers 145 and 146 extends through the seals to engage the microfilm segments. The lower portion of the cavity between the seals is connected to the exhaust tube 48 which in turn is connected to the inlet end of the blower motor 49 of FIG. 2. Any ammonia vapor which might leak past the rear pair of rollers 146 will be exhausted out of the vapor trap 37 to the bubbler 51 in the tank 52 of FIG. 2.

The developing chamber 38 includes four sets of four rollers each with the rollers in each set positioned one above the other in a stack. The distance between adjacent stacks of rollers is slightly less than the length of a microfilm segment to allow a pair of rollers in one stack to engage the segment before it is released by a pair of rollers in an adjacent stack. The chamber 38 is enclosed by the spacer plate 111, the front and rear mounting plates 112 and 113, the front developing chamber wall 144, a rear developing chamber wall 151, a developing chamber cover plate 152 and a developing chamber bottom plate 153. The developing chamber 38 is provided with ammonia vapor from the heater 45 of FIG. 2 through a supply tube 154 connected to an aperture in the spacer plate 111. The bottom plate 153 is angled downwardly toward an aperture connected to the drain tube 54 through which any condensed ammonia or water vapor is sent to the tank 52.

A lower pair of rollers 155 of the stack of rollers adjacent the front developing chamber plate 144 are spaced to engage the microfilm segments before they are released by the rear pair of rollers 146 of the vapor trap 37. The microfilm segment is then passed to a lower pair of rollers 156 of the next stack of rollers. As shown in FIGS. 4 and 7, the lower roller of each of the pairs 145, 146, 155 and 156 is driven by a belt 157 (shown in phantom) which engages a pulley 158 on each roller shaft which extends through the rear mounting plate 113. If the pulleys 158 are uniform in diameter, the rollers will rotate at the same speed to move the microfilm segments through the vapor trap 37 and into the developing chamber 38.

A lower set of rollers 159 of the next stack of rollers receives the microfilm segment from the rollers 156 and a lower pair of rollers 161 of the stack of rollers adjacent the rear developing chamber wall 151 receives the microfilm segment from the rollers 159. The vapor trap 39 includes a front pair of rollers 162 and a rear pair of rollers 163 which receive the microfilm segments from the developing chamber 38. The lower roller of each of the pairs 159, 161, 162 and 163 is driven by a belt 164 (shown in phantom) which engages a pulley 165 on each roller shaft which extends through the rear mounting plate 113. If the pulleys are uniform in diameter, the rollers will rotate at the same speed to move the microfilm segments through the developing chamber 38 and the vapor trap 39.

The shaft of each of the lower rollers 159 and 161 also extends through the front mounting plate 112 and is attached to a pulley 166. The pulleys 166 ar engaged by a belt 167 (shown in phantom) which is driven by a gear motor 168. The gear motor 168 is attached to the rearwardly facing surface of the front support plate 67 by any suitable means such as cap screws and lockwashers and has an output shaft 169 which extends through an aperture in the plate. The cap screws are inserted into horizontally elongated apertures formed in the support plate 67 and threadably engage the gear motor. The cap screws may be loosened to allow horizontal movement of the gear motor to adjust the tension on the belt 167. An idler pulley 171 is rotatably attached to the support plate 67 and engages the belt 167 to alter its path to increase its contact with the pulleys 166 thereby increasing the driving force which can be transmitted to the rollers 156 and 159. A pulley 172 is attached to the forward end of the shaft 169 and contacts the belt 167. When the gear motor 168 is connected to a source of electrical power (not shown), the motor will rotate the pulley 172 to drive the lower rollers in the pairs of rollers 156 and 159. In turn, the roller 156 drives the lower rollers in the pairs of rollers 145, 146 and 155 through the belt 157 and the roller 159 drives the lower rollers in the pairs of rollers 161, 162 and 163 through the belt 164. A plurality of idler pulleys 173 are rotatably mounted on the rear mounting plate 113 to alter the path of each of the belts 157 and 164 to increase the contact with the pulleys on the roller shafts thereby increasing the driving force which can be transmitted. Since the shafts of the lower rollers of the pairs of rollers 156 and 159 must extend beyond the front surface of the front support plate 67, they are supported in a pair of bearing adapters 174 which are attached to the front mounting plate 112.

The path of travel of the microfilm segments through the developing chamber 38 is a serpentine path defined by the stacks of rollers. The segments are drawn through by the lower pairs of rollers 155, 156, 159 and 161 from the front end of the developing chamber to the rear end where a film guide 175 attached to the rear developing chamber wall 151 forces the segments to change the direction of travel by 180°. The center pairs of rollers 161, 159, 156 and 155 now draw the segments from the rear end of the developing chamber to the front end where a film guide 176 attached to the front developing chamber wall 144 forces the segments to change the direction of travel by 180°. Now the upper pairs of rollers 155, 156, 159 and 161 draw the segments from the front of the developing chamber to the rear where the segments exit through an aperture in the rear developing chamber wall 151 and enter the vapor trap 39. One half of the circumference of each of the rollers is slightly less than the length of the film segment so that each time the direction of travel is changed the film segment is engaged by the next pair of rollers before being released by the pair of rollers presently engaging it.

The lower rollers in each stack of rollers are rotatably mounted in a plurality of bearings 177 retained in the front and rear mounting plates 112 and 113. The three rollers above each lower roller are also rotatably mounted in bearings 178, but these bearings are slidably retained in bearing guides 179, attached to the front and rear mounting plates, which permit the rollers to move in a vertical direction. Therefore, if the developing chamber cover plate 152 is removed, the top three rollers in each stack may be removed to clear any microfilm segments which may jam in the roller-defined serpentine path of travel through the developing chamber 38.

Each roller in a stack is provided with a pair of "O" rings 181 which are retained in grooves formed proximately to the ends of the rollers. Each roller in the stack frictionally engages its adjacent roller or rollers with the "O" rings such that the rotation of the lower belt driven roller is transmitted to all the rollers through the "O" ring "tires" to drive each roller in a direction opposite the rotation of its adjacent roller or rollers. The positions of the "O" rings are offset with respect to the rollers in an adjacent stack to alternate the contact of the "O" rings with the surfaces of the microfilm segments thereby preventing streaking or tracks on the developed microfiche duplicates.

As was previously discussed, the vapor trap 39 is similar in construction and operation to the vapor trap 37. The two pair of rollers 162 and 163 draw the developed microfilm segments from the developing chamber 38 and deposit them in the film receiving station 35. Any ammonia vapor which leaks past the pair of rollers 162 is exhausted through the exhaust tube 48 by the blower motor 49 of FIG. 2. The vapor trap 39 is defined by the front and rear mounting plates 112 and 113, the rear developing chamber wall 151, the developing chamber cover plate 152, a rear wall 181 and a bottom wall 182. The outside surface of the rear wall 181 has a plurality of bosses formed thereon for mounting a hopper 183 for collecting the microfilm segments as they exit the vapor trap 39.

An aperture is formed in the rear wall 181 and a slide member 184 is positioned therein to guide the microfilm segments into the hopper 183 which is included in the film receiving station 35. The hopper 183 has a plurality of tabs formed at one side edge of its front and rear walls. An aperture is formed in each tab for receiving a rod 185 which also passes through apertures in the bosses of the rear wall 181. The rods are retained in the apertures by cotter pins at either end. The upper portion of a side wall of the hopper 183 is cut away so that the front and rear walls guide the microfiche duplicates into the hopper. The bottom wall of the hopper is slanted away from the horizontal to aid in stacking the microfilm segments. A mid-portion of the front wall is cut away to provide access to the stack of microfilm segments to aid in grasping them when they are to be removed from the hopper.

In summary, the diazo film advancing module includes a mounting bracket 31 for attaching the module to a basic processing module wherein the modules cooperate to produce microfiche duplicates of the master microfiche. The mounting bracket 31 provides a base for a film drawing station 32, a film cutting station 33, a film developing station 34 and a film receiving station 35.

The basic processing module exposes metered segments of a continuous strip of microfilm in superposition with master microfiche to form latent images of the master microfiche on the exposed film. The strip of microfilm is drawn into the diazo film advancing module by the film drawing station 32 and the film segments, each containing a latent master microfiche image, are separated from the continuous strip by the film cutting station 33. Now the individual film segments are drawn into the film developing station 34 to be exposed to a heated ammonia vapor atmosphere to develop the film segments.

A metering pump 44 draws aqueous ammonia from the reservoir 41 at a rate correlated with the speed at which the film segments are drawn through the developing chamber 38. The aqueous ammonia is vaporized in a heating chamber of a heater 45 and is introduced into the developing chamber 38. Any excess ammonia vapor which is not utilized in the developing process is removed by an entrance vapor trap 37 and an exit vapor trap 39 connected to a blower motor 49. The blower motor bubbles the gas from the vapor traps through citric acid to neutralize the ammonia thereby preventing its escape to the surrounding atmosphere.

The developing station 38 includes a plurality of rollers which are mounted for rotation about a horizontal axis and are positioned in vertical stacks to define a serpentine path of travel for the film segments. Only the lower roller in each stack is driven and it in turn drives the other rollers through "O" ring "tires". The "O" ring "tires" of adjacent stacks may be offset to prevent streaking or tracking on the surfaces of the film segments. The upper rollers in each stack are easily removable for access to film segments which become jammed. The film segments exit the film developing station 34 through the vapor trap 39 and are collected in the hopper 183 of the film receiving station 35.

In accordance with the provisions of the patent statutes, I have explained the principle and mode of operation of my invention and have illustrated and described what I now consider to represent its best embodiment. However, I desire to have it understood that the invention may be practiced otherwise than as specifically illustrated and described without departing from its spirit or scope.

What I claim is:

1. A film advancing module for developing an exposed segment of a continuous strip of microfilm, comprising:

- a developing chamber having a film input opening and a film exit opening;
- means for drawing the exposed segment through said developing chamber at a predetermined speed;
- a source of ammonia connected to said developing chamber; and
- a vapor trap at at least one of said developing chamber openings for removing ammonia vapor which has escaped from said developing chamber.

2. A film advancing module according to claim 1 including means for drawing said ammonia vapor from said vapor trap and means for receiving said ammonia vapor from said drawing means.

3. A film advancing module according to claim 2 wherein said drawing means is a blower motor and said receiving means is a tank adapted to contain an ammonia neutralizing substance.

4. A film advancing module according to claim 1 including means for draining accumalated liquids from said developing chamber.

5. A film advancing module according to claim 1 including a vapor trap at each of said film entrance opening and said film exit opening, means for drawing said ammonia vapor from said vapor traps and means for receiving said ammonia vapor from said drawing means.

6. A film advancing module comprising a plurality of film stations for performing selected operations on an exposed film segment to duplicate a master microfiche wherein one of said stations is a film developing station which includes a plurality of rollers for defining a serpentine path of travel for the film segment and wherein said plurality of rollers are grouped into at least two vertical stacks and including means for driving the lower roller in each stack, each of said rollers having frictional driving means whereby each of the other ones of said rollers in said stack is driven by the adjacent lower rollers.

7. A film advancing module according to claim 6 wherein said frictional driving means includes "O" ring means connected to each of said plurality of rollers for frictionally engaging the "O" ring means of an adjacent one of said rollers in the same one of said stacks.

8. A film advancing module according to claim 6 wherein said frictional driving means engage the upper and lower surfaces of the film segment for drawing the film segment along said serpentine path and wherein said frictional driving means of said rollers in each of said stacks are offset with respect to said frictional driving means of said rollers of an adjacent one of said stacks to avoid streaking or tracking on the surface of the film segment.

9. A film advancing module according to claim 6 wherein said other rollers are removably retained in said stacks whereby said other rollers may be removed from said film developing station for access to the film segment.

10. A film advancing module according to claim 6 wherein said stacks of rollers are spaced apart at a distance slightly less than the length of the film segment.

11. A film advancing module according to claim 6 wherein the circumference of each one of said plurality of rollers is slightly less than twice the length of the film segment.

12. A film advancing module according to claim 6 wherein another one of said stations is a film cutting station which includes means for separating the film segment from a continuous strip of microfilm.

13. A film advancing module according to claim 6 wherein said film developing station includes film guide means for cooperating with said rollers to change the direction of travel of the film segment along said serpentine path of travel.

* * * * *